(12) United States Patent
Varadarajan et al.

(10) Patent No.: US 10,372,656 B2
(45) Date of Patent: Aug. 6, 2019

(54) SYSTEM, APPARATUS AND METHOD FOR PROVIDING TRUSTED INPUT/OUTPUT COMMUNICATIONS

(71) Applicant: Intel Corporation, Santa Clara, CA (US)

(72) Inventors: Srikanth Varadarajan, Hillsboro, OR (US); Reshma Lal, Hillsboro, OR (US); Steven B. McGowan, Portland, OR (US); Hakan Magnus Eriksson, Hillsboro, OR (US); Travis W. Peters, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 15/356,720

(22) Filed: Nov. 21, 2016

(65) Prior Publication Data

US 2018/0145951 A1 May 24, 2018

(51) Int. Cl.
| | |
|---|---|
| *G06F 13/40* | (2006.01) |
| *H04W 12/02* | (2009.01) |
| *G06F 21/57* | (2013.01) |
| *G06F 13/28* | (2006.01) |
| *G06F 21/85* | (2013.01) |
| *H04L 29/06* | (2006.01) |
| *H04L 9/06* | (2006.01) |

(52) U.S. Cl.
CPC .......... *G06F 13/4068* (2013.01); *G06F 13/28* (2013.01); *G06F 21/57* (2013.01); *G06F 21/85* (2013.01); *H04L 9/065* (2013.01); *H04L 63/0464* (2013.01); *H04L 69/22* (2013.01); *H04W 12/02* (2013.01); *H04L 2209/127* (2013.01)

(58) Field of Classification Search
CPC ....... H04L 63/0428; H04L 9/14; H04L 63/06; H04L 9/00; H04L 9/08; H04L 9/065; H04L 63/0464; H04L 69/22; H04W 12/04; H04W 12/02; G06F 13/4068; G06F 21/57; G06F 13/28; G06F 21/85
USPC ......................................... 713/150, 168, 171
See application file for complete search history.

(56) References Cited

U.S. PATENT DOCUMENTS

| | | | |
|---|---|---|---|
| 7,367,045 B2* | 4/2008 | Ofek | H04L 47/10 380/255 |
| 2008/0209203 A1* | 8/2008 | Haneda | G06F 21/72 713/150 |
| 2015/0143118 A1 | 5/2015 | Sheller et al. | |
| 2016/0094338 A1 | 3/2016 | Pappachan et al. | |
| 2016/0094558 A1 | 3/2016 | Lal et al. | |
| 2016/0191236 A1* | 6/2016 | Smirnoff | H04L 63/062 713/171 |
| 2016/0232335 A1* | 8/2016 | Violleau | G06F 21/30 |
| 2016/0283747 A1 | 9/2016 | Xing et al. | |

* cited by examiner

*Primary Examiner* — Thanhnga B Truong
(74) *Attorney, Agent, or Firm* — Trop, Pruner & Hu, P.C.

(57) ABSTRACT

In one embodiment, an apparatus includes a wireless controller, which may include a byte stream parser to receive a stream of data from one or more wireless devices and parse the stream of data to identify a first data packet associated with a first channel identifier associated with a trusted application, and a cryptographic engine coupled to the byte stream parser to encrypt a payload portion of the first data packet in response to the identification of the first data packet associated with the first channel identifier. Other embodiments are described and claimed.

18 Claims, 10 Drawing Sheets

SYSTEM, APPARATUS AND METHOD FOR PROVIDING TRUSTED INPUT/OUTPUT COMMUNICATIONS

TECHNICAL FIELD

Embodiments relate to providing trusted communication within computing systems.

BACKGROUND

Trusted execution environments (TEEs) provide a secure environment for application code and data. But data provided to a TEE from input devices such as a keyboard, as well as data sent from the TEE to an output device such as speaker are subject to stealing by malware. For example, while password handling in a web browser may be secured within the TEE, the password value itself is susceptible to keylogger malware as the user types the password into the keyboard. Further, wireless connectivity protocols may provide cryptographic protection of data transferred over-the-air. For example, input keystrokes are cryptographically secured between a wireless keyboard and a wireless controller. However, once decrypted in the controller, the data becomes subject to attack within a computing device.

DETAILED DESCRIPTION

In various embodiments, techniques are provided to secure data communicated between a wireless controller of a computing system and a trusted execution environment of the computing device. In some cases the wireless controller and TEE may be present within a single semiconductor device such as a system on chip (SoC) or other processor implemented as an integrated circuit (IC). In other cases, these components may be present in different ICs or other components of a given computing platform.

As will be described further herein, embodiments may use a byte stream parser (BSP) and a cryptographic engine (CE) to identify and cryptographically secure data received from specific wireless devices and endpoints. In embodiments, the BSP can be implemented as a fixed state machine hardware, firmware running in a microcontroller, or as other hardware, software and/or firmware or combinations thereof. In some cases, the BSP may be implemented as a single hardware parser to differentiate data from individual devices across multiple wireless controllers. In operation, this byte stream parser is configured to parse a serial byte stream to: identify physical or logical channels for each connected wireless device; parse the channel-specific byte stream to differentiate data packets from control packets for each wireless device and endpoints within a single wireless device; and parse the data packets to differentiate header information from payload information. The CE may be configured to secure data payloads while leaving packet headers in the clear, so that existing wireless middleware and drivers can operate without modification. Note that as used herein, the term "in the clear" refers to information in an unencrypted form, while information in an encrypted format may be referred to herein interchangeably as "encrypted" information or "ciphertext."

Using an embodiment, end-to-end secure communication may be realized, providing confidentiality, integrity, replay protection and source authenticity for input/output (IO) data from/to wireless devices connected to a system. Note that this "end-to-end secure communication" is thus between an originator and a consumer, such that as the data traverses a full path to an end consumer the data may be in an encrypted format as it traverses through various hardware and software components/layers between source and destination. In addition, embodiments may reduce power and processing requirements for the wireless device itself, as the additional parsing/encryption can be performed in or in close proximity to the wireless controller, rather than in the wireless device itself. Still further with an embodiment, the size of a Trusted Computing Base (TCB) may be reduced to only the software/hardware that is to access the received data in the clear. In this way, a host operating system (OS) including device drivers, virtual machine monitor (VMM), basic input/output system (BIOS) etc., are not included in the TCB.

Figure 1A:
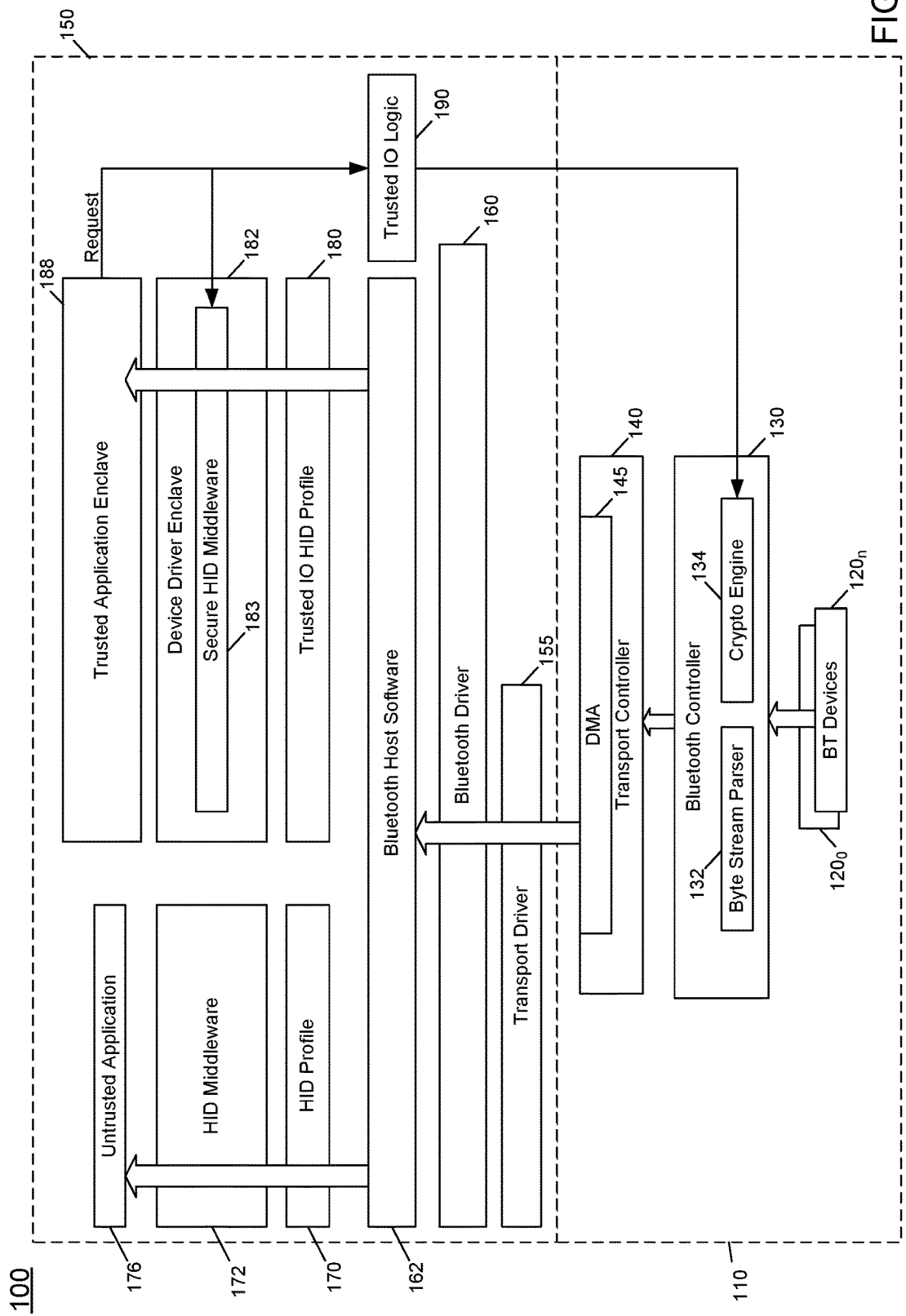
FIG. 1A is a block diagram of a communication architecture in accordance with an embodiment of the present invention.

Referring now to FIG. 1A, shown is a block diagram of a communication architecture in accordance with an embodiment of the present invention. More specifically architecture 100 shown in FIG. 1A enables wireless communication between different devices. In the embodiment shown, architecture 100 includes hardware 110, which may be implemented as one or more separate hardware devices. As some examples, hardware 110 may include a given computing system such as a wireless communication device, e.g., a smartphone, personal digital assistant, tablet computer, laptop computer or so forth, in an embodiment. In addition, one or more wireless devices separate from the wireless communication device (such as an input/output or other peripheral device) may communicate wirelessly with the wireless communication device. More specifically as shown, a plurality of wireless devices $120_0$-$120_n$ may communicate wirelessly (over-the-air (OTA)) with a wireless controller 130 of the wireless communication device. In the embodiment shown, wireless controller 130 is implemented as a Bluetooth™ controller when one or more of devices 120 are Bluetooth™-compatible devices. In some embodiments, the Bluetooth™-compatible devices may be wireless devices such as keyboards, pointer devices, sensors such as health sensors, radios, or other Internet of Things (IoT) devices to communicate with the wireless computing device. Note that while FIG. 1A is described in the context of Bluetooth™-based communications and support, embodiments are not so limited and it is understood that a given system may provide support for additional wireless communication protocols.

In the illustration shown, Bluetooth™ controller 130 includes a byte stream parser 132 and a cryptographic engine 134. Understand of course that additional circuitry may be present within Bluetooth™ controller 130. As will be described herein, byte stream parser 132 is configured to parse an incoming stream to identify header and payload portions and to enable decryption operations to occur in cryptographic engine 134, when the incoming payload is encrypted. In embodiments, BSP 132 can identify boundaries of stream headers and data payload. Still further, in embodiments that provide for a trusted IO path, cryptographic engine 134 may further encrypt the payload portion to enable a secure communication to a destination, such as a trusted application enclave 188, within a software stack 150.

As further illustrated in FIG. 1A, a serial transport stream may be provided from Bluetooth™ controller 130 that includes the communications received from wireless devices 120. As illustrated, such serial transport stream may be communicated via a transport controller 140. In an embodiment transport controller 140 may include a universal asynchronous receiver transmitter (UART) and/or universal serial bus (USB) logic to perform transport stream operations. In addition transport controller 140 may further include a direct memory access (DMA) logic 145, which may be implemented to store the transport stream in a given memory such as a DMA buffer of a host memory, e.g., in response to a buffer allocation in the host memory issued from a driver or other software. In embodiments, a single shared DMA channel may be used to transfer data from multiple wireless devices 120 to the host memory. For example, Bluetooth™ controller 130 may implement or be coupled to transport controller 140 that uses a serial interface via UART or USB, which in turn uses a single DMA channel.

FIG. 1A further illustrates details of software stack 150. As seen, a transport driver 155 provides for communication of shared DMA paths for both encrypted and clear data packets, which are provided through a Bluetooth™ driver 160 to a Bluetooth™ host software 162. As will be described herein, Bluetooth™ host software 162 may access data packets in host memory upon receipt of signaling that a DMA transfer has completed. Bluetooth™ host software 162 may, based upon certain identification information associated with given data packets, direct such packets to an intended destination, such as one of an untrusted application 176 and a trusted application 188. As illustrated, an untrusted software stack includes, in addition to untrusted application 176, a human interface device (HID) profile 170 and a HID middleware 172. HID profile 170 may be configured as a filter to receive an input payload from Bluetooth™ host software 162 and send to HID middleware 172 for processing.

In turn, device driver enclave (DDE) 182 may include trusted software including trusted middleware for a specific wireless controller. Note further that device driver enclave 182 includes a secure HID middleware 183 which may be used to perform processing on the incoming encrypted data packets received from Bluetooth™ host software 162. Trusted IO HID profile 180 may be configured as a filter to receive an encrypted payload and send it to DDE 182 for decryption and further processing.

Note that in various embodiments, DDE 182 and trusted application enclave (TAE) 188 may be independent trusted environments or enclaves. Although the scope of the present invention is not limited in this regard, embodiments may implement the DDE and TAE within protected portions of a SoC or other processor. As examples, such protected environments may be implemented using one or more Intel® Software Guard Extensions (SGX) enclaves or other protected domain of a system. These technologies, along with platform infrastructure software can provide these TEE/secure enclaves by isolating memory regions from an operating system (OS) and providing access control rules around memory regions, to only allow access to authorized entities. In different embodiments, various hardware such as one or more general-purposes processor cores, security coprocessor, other intellectual property (IP) block integrated into SoC or other processor can provide a TEE, such as using a converged security manageability engine (CSME). In still other embodiments, a TEE may be implemented using Intel® TXT technology, an ARM TrustZone, or any other secure container, enclave or so forth.

Thus wireless controller 130 receives encrypted OTA input, decrypts these OTA encrypted packets and multiplexes data from all connected wireless devices into a single stream of bytes. This stream is transferred to host memory via shared DMA logic 145 in transport controller 140. Bluetooth™ host software 162 may be configured to demultiplex the data packets and use the appropriate profile/middleware (HID middleware 172 or secure HID middleware 183) for data processing before sending the data for application consumption. In an example of keyboard data, a HID profile registered with the Bluetooth™ host software 162 receives the input scan code and the corresponding HID middleware is used to convert the scan codes to key codes.

Still with reference to FIG. 1A, a trusted IO logic 190 is provided. Such trusted IO logic 190 may operate as described herein to set up and control interaction between trusted application 188 and Bluetooth™ controller 130 for trusted IO communications, in turn received from or communicated to wireless devices 120. In embodiments, trusted IO logic 190 may be implemented as a trusted software running within a TEE such as a software trusted IO core service to perform secure enumeration of wireless controllers and program a given cryptographic key for a specified channel ID into cryptographic engine 134.

For a trusted IO flow, TAE 188 requests, e.g., secure keyboard input. Trusted IO logic 190 performs secure enumeration to determine whether any Bluetooth™ keyboard is connected. The channel ID for the Bluetooth™ keyboard is identified. Trusted IO logic 190 securely programs wireless controller 130 with an encryption key for confidentiality and a trusted HID profile identifier, only for the identified channel ID. In one embodiment, trusted IO logic 190 may securely program the key using a trusted binding instruction provided by the TEE, such as an EBIND/UNWRAP instructions for an Intel® SGX implementation. In an embodiment, trusted IO logic 190 also programs (securely) the corresponding decryption key in enclave 182. Another method could be by fusing a key into wireless controller 130 and making the key available to enclave 182 securely.

When incoming data packets received over-the-air from one or more Bluetooth™ devices 120 are encrypted, they are decrypted in Bluetooth™ controller 130. Byte stream parser 132 parses the decrypted packets and identifies the packets belonging to a channel ID programmed previously. In turn, CE 134 is used to encrypt the payload of only those packets, leaving the headers in the clear. Note that data packets for other devices are not encrypted. An authentication tag (AT) may, in an embodiment, be associated in-band to the same buffer containing the encrypted payload. In other cases, the AT could also be sent out-of-band via separate buffers and synchronized with encrypted payloads in enclave 182.

In an embodiment, Bluetooth™ controller 130 may further be configured to replace a Bluetooth™ profile identifier in the packet header with the programmed trusted profile identifier, so that encrypted packets are filtered and sent to trusted IO HID profile 180. To this end, Bluetooth™ host software 162 filters the encrypted data packets and directs them to trusted IO HID profile 180, which in turn forwards the packets to enclave 182. In turn, enclave 182 verifies that the encrypted packet is integrity and replay protected using the AT, decrypts the packet using the programmed key and performs middleware processing. Assuming that this verification succeeds, enclave 182 may decrypt the payload portion, resulting in HID scan codes, which may be converted to key codes after decryption for trusted application consumption. Enclave 182 may then send the keyboard data to trusted application enclave 188 for consumption, via a secure channel.

Understand while shown at this high level in the embodiment of FIG. 1A, many variations and alternatives are possible. Note that in different embodiments, the placement of the BSP and the cryptographic engine results in different configurations. In one configuration, the BSP may be implemented as firmware to execute within a wireless controller such as shown in FIG. 1A. In case of Bluetooth™, the controller may already have knowledge about a host controller interface (HCI) layer and some logical link control and adaptation protocol (L2CAP) layer information. The parser can be implemented as an extension to the firmware to differentiate the data streams and headers. In this case, cryptographic engine 134 within Bluetooth™ controller 130 can be used to encrypt the data after parsing.

Figure 1B:
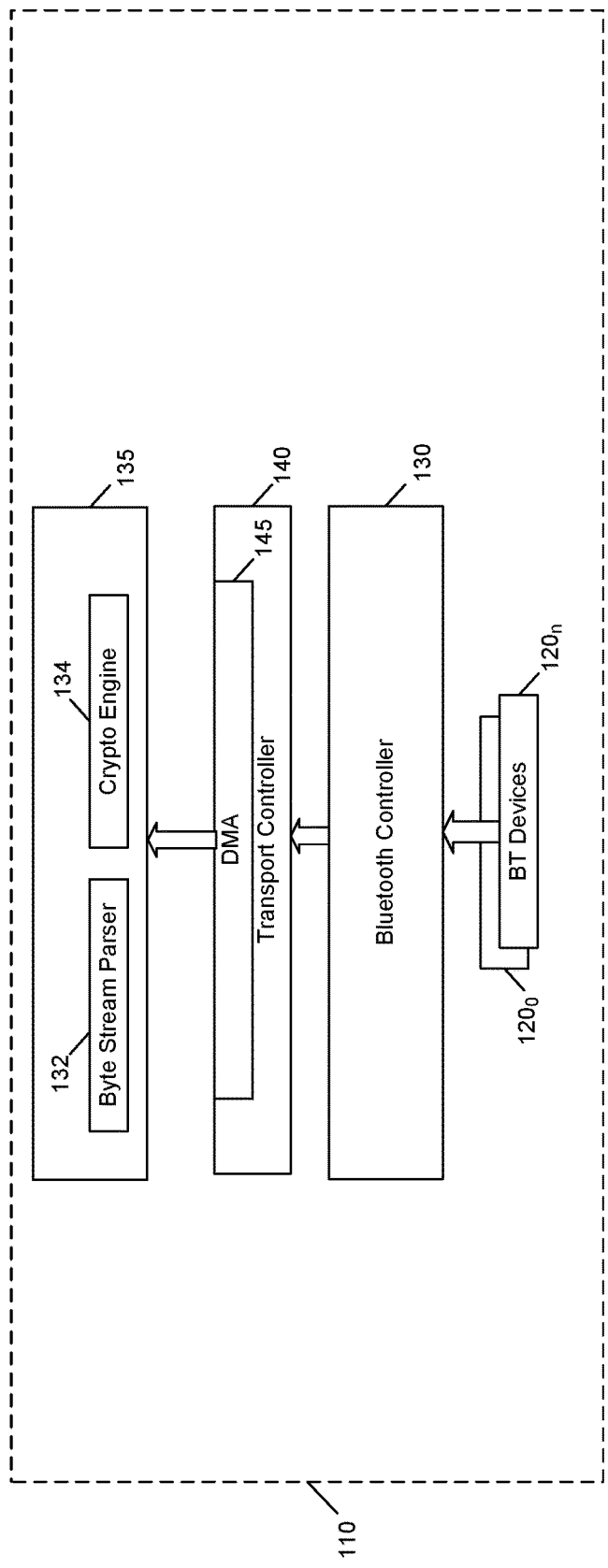
FIG. 1B is a block diagram of a communication architecture in accordance with another embodiment of the present invention.

In another configuration, the BSP can be implemented in a single hardware IP block with a central cryptographic engine, which may also be used for trusted IO communications for wired controllers. This embodiment is shown in FIG. 1B, which is a block diagram of a communication architecture in accordance with another embodiment of the present invention. More specifically, architecture 100' may be adapted very similarly to that of FIG. 1A (in this illustration, only the hardware portion of the environment is shown, as the software stack may be simultaneously adapted as in FIG. 1A, in an embodiment). However, note that Bluetooth™ controller 130 does not include a byte stream parser and/or cryptographic engine. Instead, a separate IP logic 135 is present, e.g., within a single SoC with other components and which may include byte stream parser 132 and cryptographic engine 134.

In some embodiments, this cryptographic engine may be used for handling all cryptographic operations regardless of communication protocol, wired or wireless. In this case, even though all Bluetooth™ data is DMA'ed in a single stream, the CE is configured to differentiate data for selected Bluetooth™ endpoints and encrypt accordingly. In a still further configuration, the BSP and an associated cryptographic engine can be implemented as a standalone hardware IP logic block, separate from a central cryptographic engine. This IP logic may be specific to all other wireless controllers in the system. Since all wireless controllers follow similar networked protocols, the parser may be configured to understand data stream and header differentiation for all wireless standards.

Figure 2:
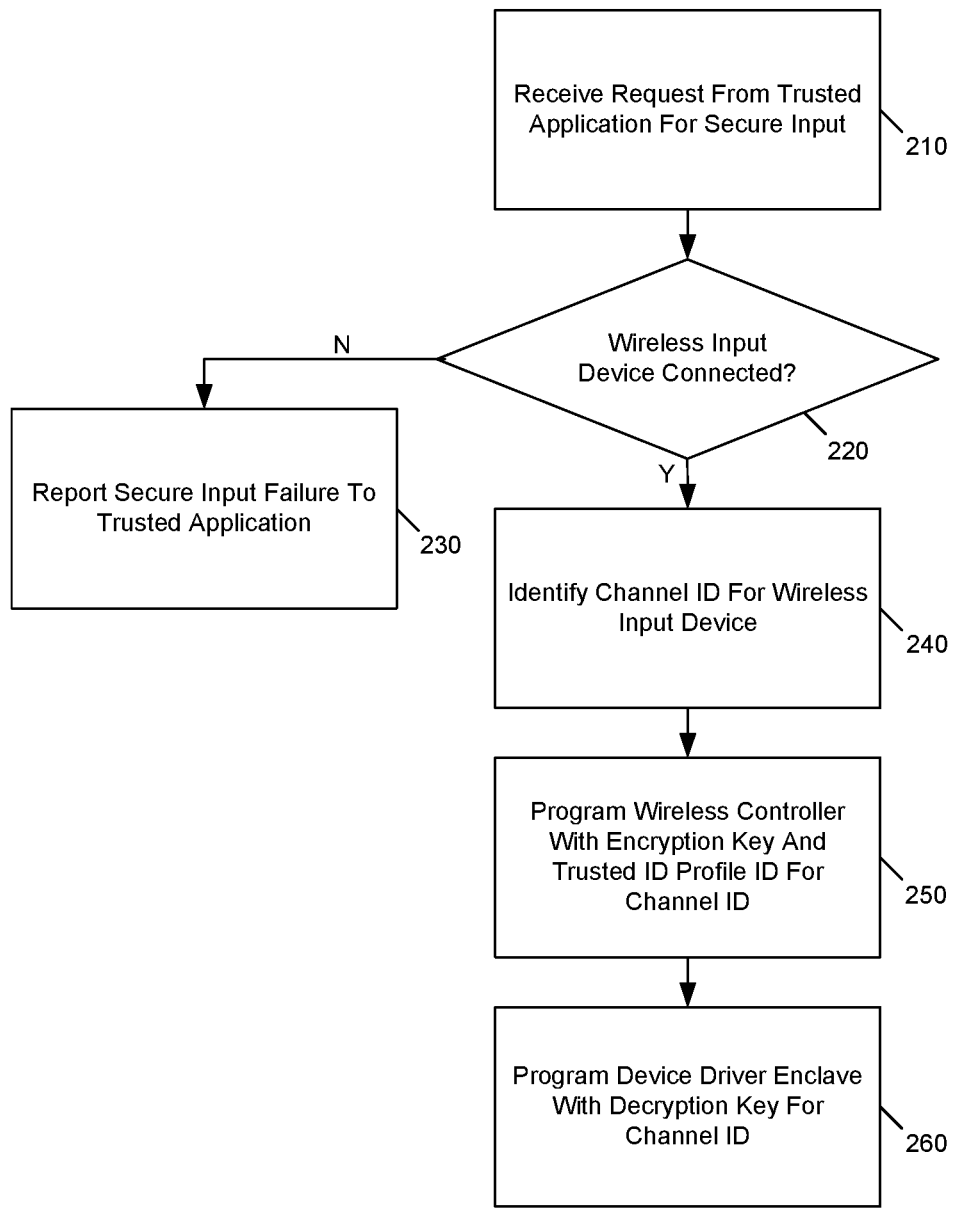
FIG. 2 is a flow diagram of a method in accordance with an embodiment of the present invention.

Referring now to FIG. 2, shown is a flow diagram of a method in accordance with an embodiment of the present invention. More specifically, method 200 is a method for performing a setup procedure to enable a trusted application to communicate via a trusted IO path with a wireless controller that in turn couples to one or more wireless devices. In different embodiments, method 200 may be performed by combinations of hardware, software and/or firmware, including the architecture shown in FIG. 1A or 1B, in which hardware interacts with various layers of a software stack to perform secure end-to-end data communications as described herein. While in the context of FIG. 2, method 200 is described with regard to a Bluetooth™-based wireless communication protocol, understand the scope of the present invention is not limited in this regard, and embodiments apply equally to other wireless communication protocols, including an Institute for Electrical and Electronics Engineers (IEEE) 802.11 (a so-called Wi-Fi™) communication protocol, a communication protocol in accordance with a specification from the Wireless Gigabit Alliance, among others.

As illustrated, method 200 begins by receiving a request for secure input from a trusted application (block 210). In an embodiment, this request may be received by trusted IO logic of a software stack, which may execute on various hardware circuitry of a system, e.g., of a given TEE. As an example, this request may be from a user-level application that seeks secure input from a user. Next control passes to diamond 220 to determine whether a wireless input device is connected (diamond 220). This determination may be based, at least in part, on a secure enumeration process performed by the trusted IO logic to determine presence of a given wireless device. In an embodiment, this enumeration process may be used to obtain a channel identifier for such one or more wireless devices. In an embodiment, a channel ID is a unique ID for a data stream from a specific wireless device. As an example, in case of a Bluetooth™ communication a combination of HCI Connection Handle and L2CAP Channel ID identifies a specific Bluetooth™ device endpoint.

In an embodiment, the trusted IO logic or other trusted software may initiate a secure enumeration process to determine the devices connected to the wireless IO controllers in the system, along with the channel IDs. Note that this enumeration may be performed before initiating a trusted input data flow. Note that if no such wireless input device is connected, control passes to block 230 where a secure input failure may be reported to the trusted application. If so, the trusted application may take appropriate action, e.g., in accordance with a given security policy. For example, the trusted application may not allow access to protected resources in this case.

Still with reference to FIG. 2 if at least one wireless input device is identified as being connected, control passes to block 240 where a channel ID for the wireless input device may be identified. Thereafter, control passes to block 250 where a wireless controller (e.g., a Bluetooth™ controller) may be programmed with an encryption key and a trusted HID profile ID for the given channel ID. Various types of encryption keys may be used in different embodiments. For example, such encryption key may be a symmetric key according to an Advanced Encryption Standard (AES) protocol. Of course, other type of cryptographic keys may be used in other embodiments. Thereafter, control passes from block 250 to block 260 where a device driver (such as a device driver enclave associated with the trusted application) is programmed. More specifically this programming may provide a corresponding decryption key to the device driver enclave to enable the device driver enclave to decrypt incoming communications that were previously encrypted with the encryption key provided to the wireless controller. At this point the application is ready to perform secure data communication as described herein. Understand while shown at this high level in the embodiment of FIG. 2, many variations and alternatives are possible.

Figure 3A:
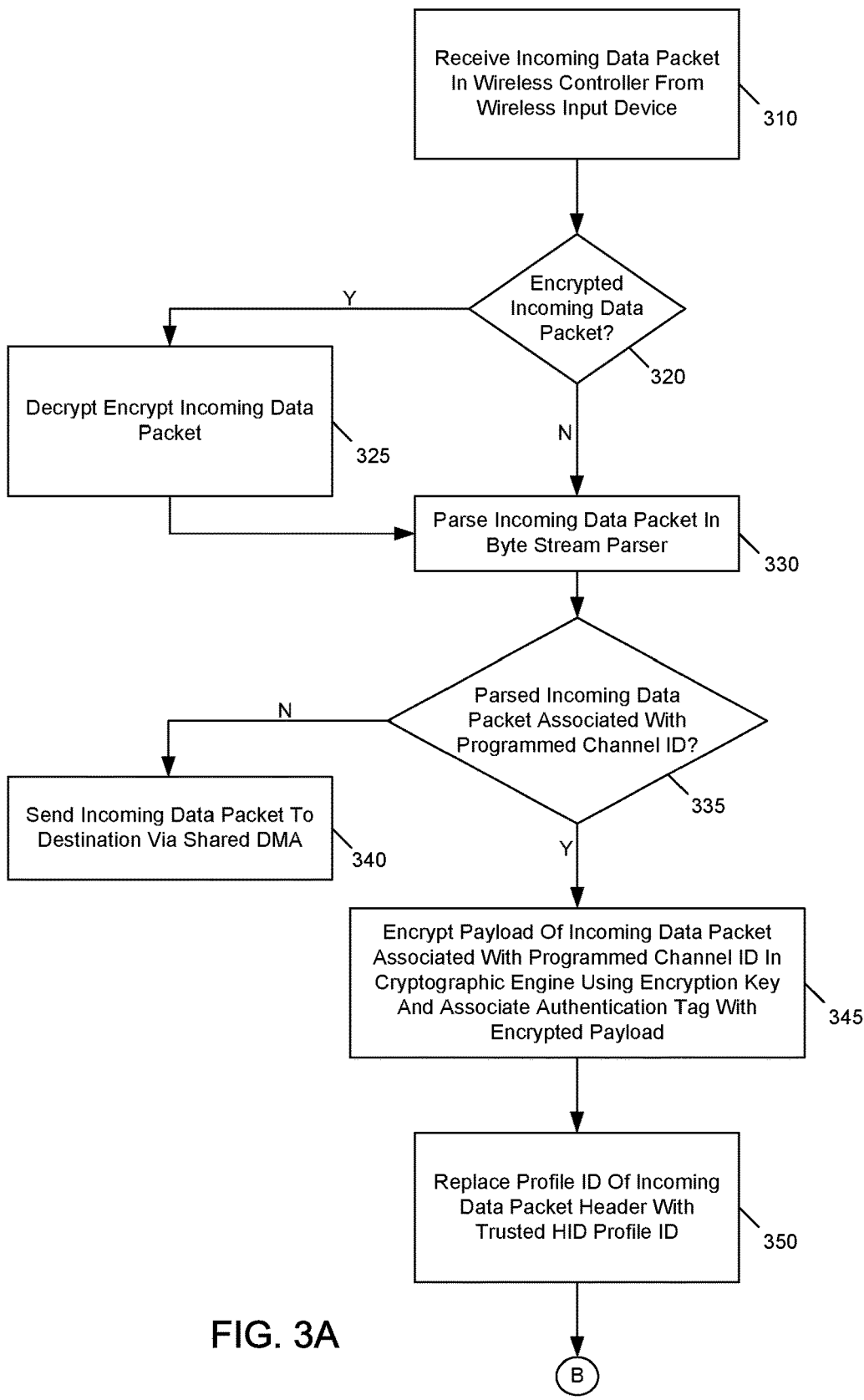
FIGS. 3A and 3B are additional flow diagrams of a method in accordance with an embodiment of the present invention.
Figure 3B:
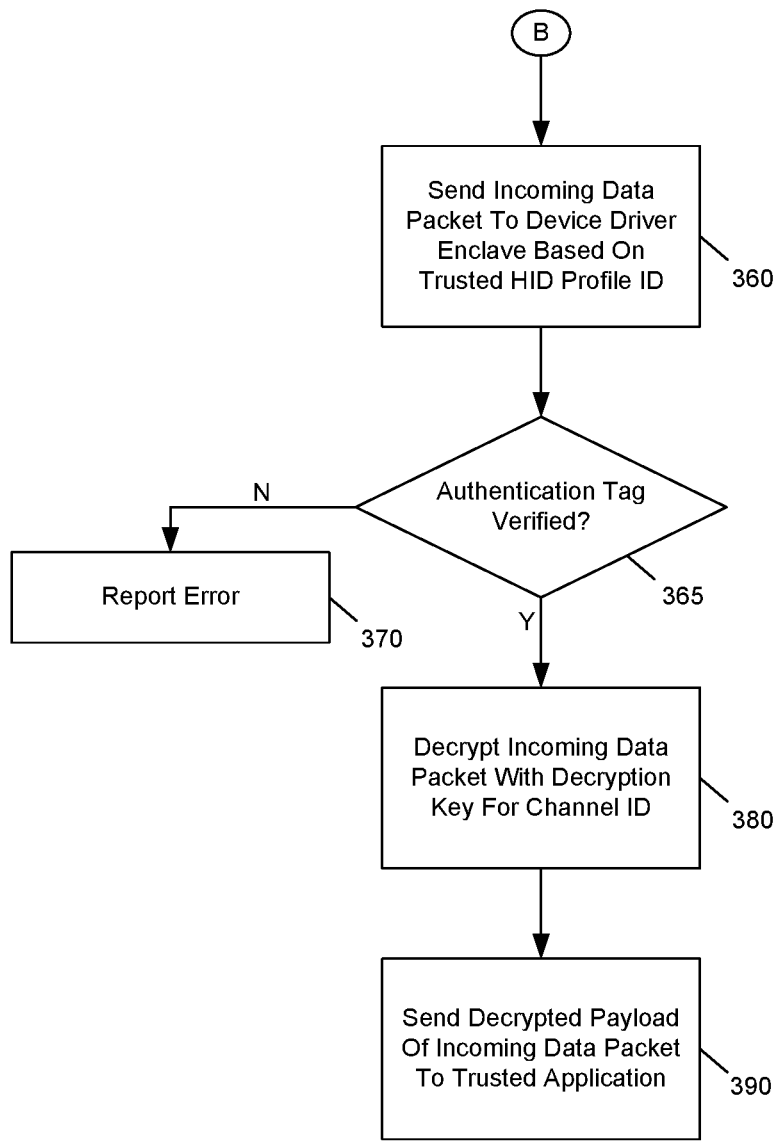

Referring now to FIGS. 3A and 3B, shown are additional flow diagrams of a method in accordance with an embodiment of the present invention. More specifically, FIGS. 3A and 3B show a method 300 for performing secure IO data communications between a wireless device and a trusted application to receive data input from such wireless device. While embodiments are applicable to securing input data from any wireless device (and output data to such devices), for purposes of describing the flows, a Bluetooth™ HID keyboard is used as a representative example of a wireless device. Please note that the Bluetooth™ keyboard is assumed to be paired to the Bluetooth™ controller and uses a secure cryptographic session for over-the-air data transfer as described in a Bluetooth™ specification such as the Bluetooth™ Core Specification Version 4.2 (December 2014).

As illustrated, method 300 begins by receiving an incoming data packet in a wireless controller from a wireless input device (block 310). For example, assume the presence of a wireless keyboard as the wireless input device and a Bluetooth™ controller, e.g., implemented as a given intellectual property (IP) logic of a SoC or other processor as the wireless controller. Next it is determined whether the incoming data packet is encrypted (diamond 320). That is, in different use cases, incoming data communications from the wireless input device may be encrypted or unencrypted depending upon configuration, type of data, type of computing resource or so forth. If it is determined that the incoming data packet is encrypted, control passes to block 325 where this encrypted incoming data packet can be decrypted. For example, a cryptographic engine can perform decryption according to a given Bluetooth™ communication protocol.

Still with reference to FIG. 3A, from both of diamond 320 and block 325, control passes to block 330 where the incoming data packet can be parsed in a byte stream parser. As described herein, this byte stream parser, which may be implemented within the Bluetooth™ controller, may be used to parse the data packet to identify presence of various headers and other network protocol elements of the data packet (generally referred to herein as "non-payload" information). From this parsing, a logical channel within a wireless device, physical connection and the actual location of a data payload (such as a HID payload) and header boundary can be determined, among other information.

Next control passes to diamond 335 to determine whether the parsed incoming data packet is associated with a programmed channel ID. That is, it is determined whether this incoming packet is for a destination corresponding to a trusted application or other trusted agent that previously registered with the trusted IO logic. If not, control passes to block 340 where the incoming data packet can be sent to its destination via a shared DMA path. Understand that this shared DMA path may be used to communicate the incoming data packet through an untrusted software stack to a given destination, such as an untrusted application.

If it is determined that the parsed incoming data packet is associated with a programmed channel ID, control passes to block 345 where the payload portion of the incoming data packet is encrypted. More specifically, this payload portion can be encrypted in a cryptographic engine of the wireless controller using an encryption key. In addition to encrypting the payload portion of the data packet (but not its non-payload portion), an authentication tag may be associated with this encrypted payload. In an embodiment, the AT is metadata associated with cryptographic operations for input/output data that provides integrity and anti-replay protection. For an input case, this AT may be generated by the CE and can be verified by trusted software before consuming data. In different embodiments, association of the authentication tag may be by attaching this authentication tag in band to the same buffer including the encrypted payload. In other cases, this authentication tag may be sent out-of-band, e.g., via a separate buffer. In such cases, this out-of-band authentication tag may be synchronized with the encrypted payload. Control next passes to block 350, where a profile ID of the incoming data packet can be replaced with a trusted HID profile ID. Note that this profile ID (and replaced trusted HID profile ID) may be present in a header of the incoming data packet.

With reference now to FIG. 3B, method 300 continues with control next passing to block 360 where the incoming data packet is sent to the device driver (e.g., a device driver enclave) associated with the trusted application. More specifically, this incoming data packet, having a newly encrypted payload portion, may be directed to the device driver based on the trusted HID profile ID. Control next passes to diamond 365 to determine whether the authentication tag associated with this packet is verified. If not, control passes to block 370 where an error may be reported. More specifically, in an embodiment, this error corresponding to an authentication failure may be reported to the trusted application.

Otherwise if it is determined that the authentication tag is verified, control passes to block 380 where the device driver can decrypt the incoming data packet with the corresponding decryption key associated with the channel ID. In addition, any further processing may be performed by the device driver. For example, in the case of a keyboard device, this additional processing may include conversion of physical scan codes to key codes. Finally, control passes to block 390 where the device driver enclave sends the processed payload of the incoming data packet to the trusted application. Understand while shown at this high level in the embodiment of FIGS. 3A-3B, the scope of the present invention is not limited in this regard and many variations and alternatives are possible.

Figure 4:
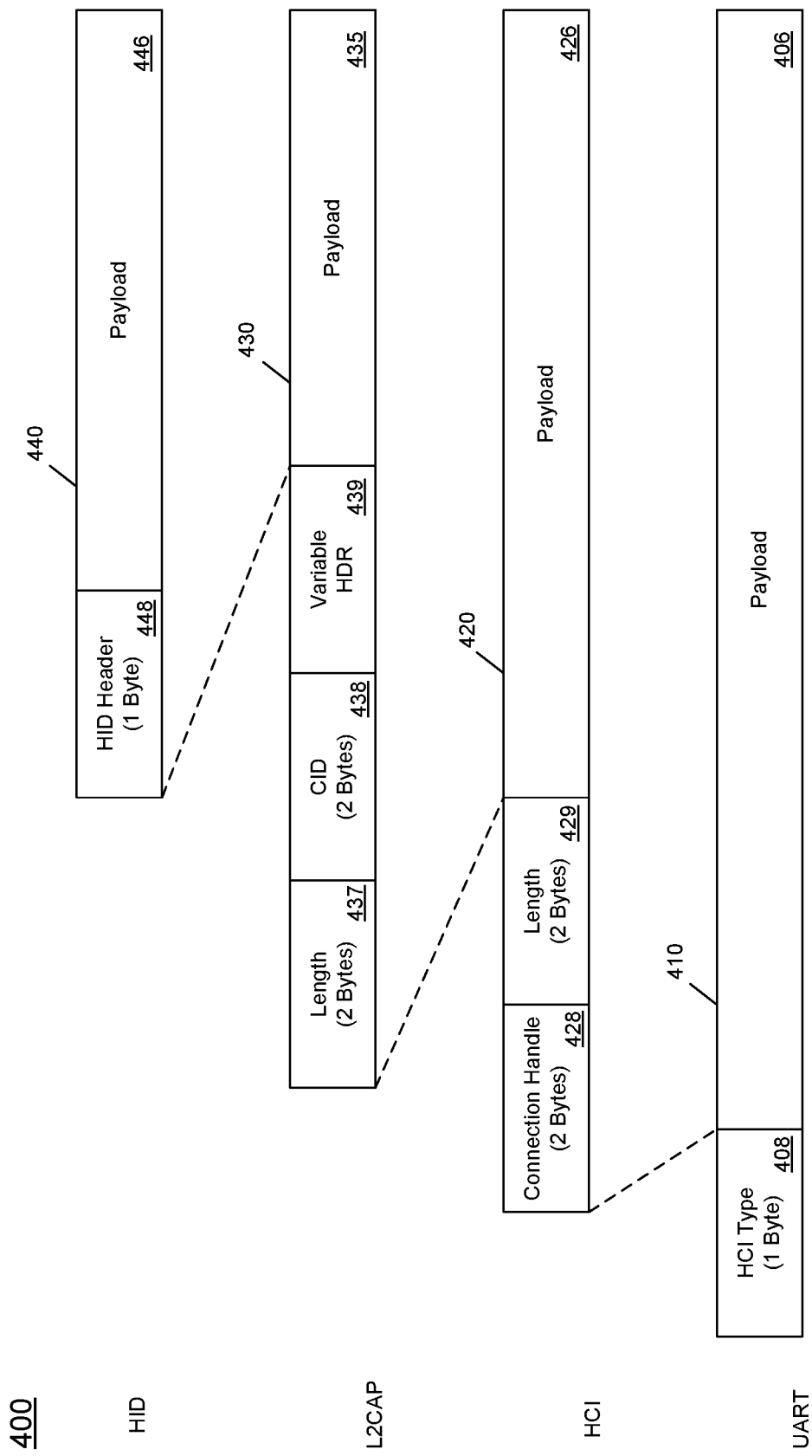
FIG. 4 is an illustration of packet information available at different layers of a wireless communication protocol in accordance with an embodiment.

Wireless standards such as Bluetooth™ may follow a highly stacked network protocol, where each layer has a header and data. In this way, reading data in an inner layer implies parsing a byte stream for all previous layers. Referring now to FIG. 4, shown is an illustration of packet information available at different layers of a wireless communication protocol in accordance with an embodiment. More specifically as shown in FIG. 4, a set of data packets 400 is illustrated that traverses through a plurality of layers of a communication stack. At an initial layer of a HID device such as a Bluetooth™ keyboard, a HID packet 440 is generated that includes a data payload 446 (which in an embodiment may be a keyboard scan code) and a HID header 448 which may be a one byte header. As this packet traverses through the wireless device for communication, additional header information is included in the various layers. Thus as next seen, an L2CAP layer generates a packet 430 including a data payload 436 (which corresponds to all of HID packet 440). In addition, various header information is present in L2CAP packet 430, including a length field 437, a channel ID (CID) field 438, and a variable header field 439. In turn, this L2CAP packet 430 is provided to an HCI layer, which generates an HCI packet 420 including a data payload 426 corresponding to the full L2CAP packet 430, along with header information including a connection handle field 428 and a length field 429. Finally, HCI packet 420 is provided as a payload 406 of a UART data packet 410 that further includes a header including an HCI type field 408. It is the L2CAP packet 430 that may be communicated from the wireless device and directed to a wireless controller. In various embodiments, note that header information may be communicated in the clear, while payload information can be encrypted prior to communication.

Figure 5:
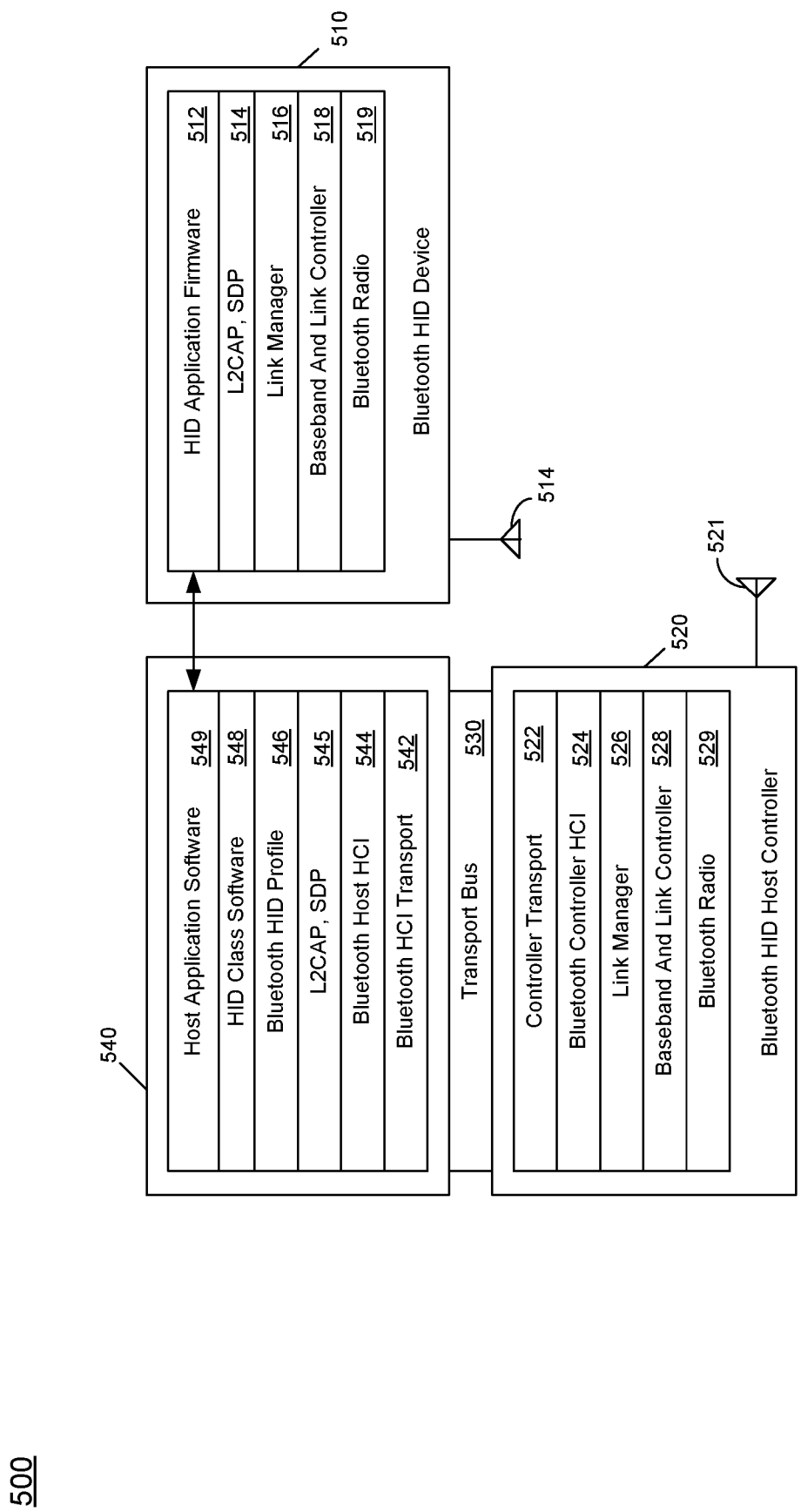
FIG. 5 is a block diagram of an interaction between a wireless device and a host controller in accordance with an embodiment of the present invention.

Referring now to FIG. 5, shown is a block diagram of an interaction between a wireless device and a host controller in accordance with an embodiment of the present invention. As shown in FIG. 5, in environment 500 a Bluetooth™ HID device 510 interacts with a Bluetooth™ HID host controller 520. For purposes of discussion, assume that Bluetooth™ HID device 510 is a Bluetooth™ keyboard and Bluetooth™ HID host controller 520 is an internal Bluetooth™ controller of an SoC or other processor. In the embodiment shown, Bluetooth™ HID device 510 includes a layered Bluetooth™ protocol in which a HID application firmware 512 executes to receive incoming HID data and packetize such information and pass it to a next layer, which may be an L2CAP and service discovery protocol (SDP) layer 514, which further encapsulates the data and provides the same to a link manager layer 516. Link manager layer 516 performs link management activities with regard to the information and passes it in turn to a baseband and link controller layer 518 that in turn provides a Bluetooth™ data packet for communication by way of a Bluetooth™ radio 519, which may include various hardware circuitry, such as a physical layer circuit configured to transmit and receive information. As illustrated, Bluetooth™ HID device 510 includes an antenna 511 to wirelessly communicate data packets, which may be received by a corresponding antenna 521 of a Bluetooth™ HID host controller 520.

Bluetooth™ HID host controller 520 may similarly include a layered architecture in which incoming packets are processed in reverse through a layered protocol including Bluetooth™ radio 529, a baseband and link controller layer 528, a link manager layer 526, a Bluetooth™ controller HCI layer 524 and a controller transport layer 522, that in turn communicates packets via a transport bus 530 to a software stack 540. In the embodiment shown software stack 540 further includes a layered hierarchy, including a Bluetooth™ HCI transport layer 542, a Bluetooth™ host HCI layer 544, an L2CAP/SDP layer 545, a Bluetooth™ HID profile layer 546, a HID class software layer 548, and finally a host application software 549, which may be a destination or consumer of the HID data, namely keyboard scan codes as received and parsed from this packetized layered protocol. Understand while shown at this high level in the embodiment of FIG. 5, many variations and alternatives are possible.

Thus a host controller including a BSP as described herein may be configured to identify data from a specific wireless device by parsing of headers as shown in FIG. 4. Each wireless device in turn may have more than one endpoint available, each with its own data representation in packets. As an example, a Bluetooth™ keyboard may have two endpoints, one for battery level indication, serviced by a battery (BATT) profile and another for actual key presses, serviced by a HID profile. The header information in various layers is used by host software for packet routing. As such, in an embodiment, while payload data may be encrypted end-to-end, header information may remain in the clear to allow correct packet handling and routing. Thus in various embodiments, secure mechanisms are provided for a TEE to consume input data from wireless devices. Note that such internal encryption of data packets may be for only specific devices (and/or only specific endpoints of such devices), leaving the rest of the packets in the clear.

Figure 6:
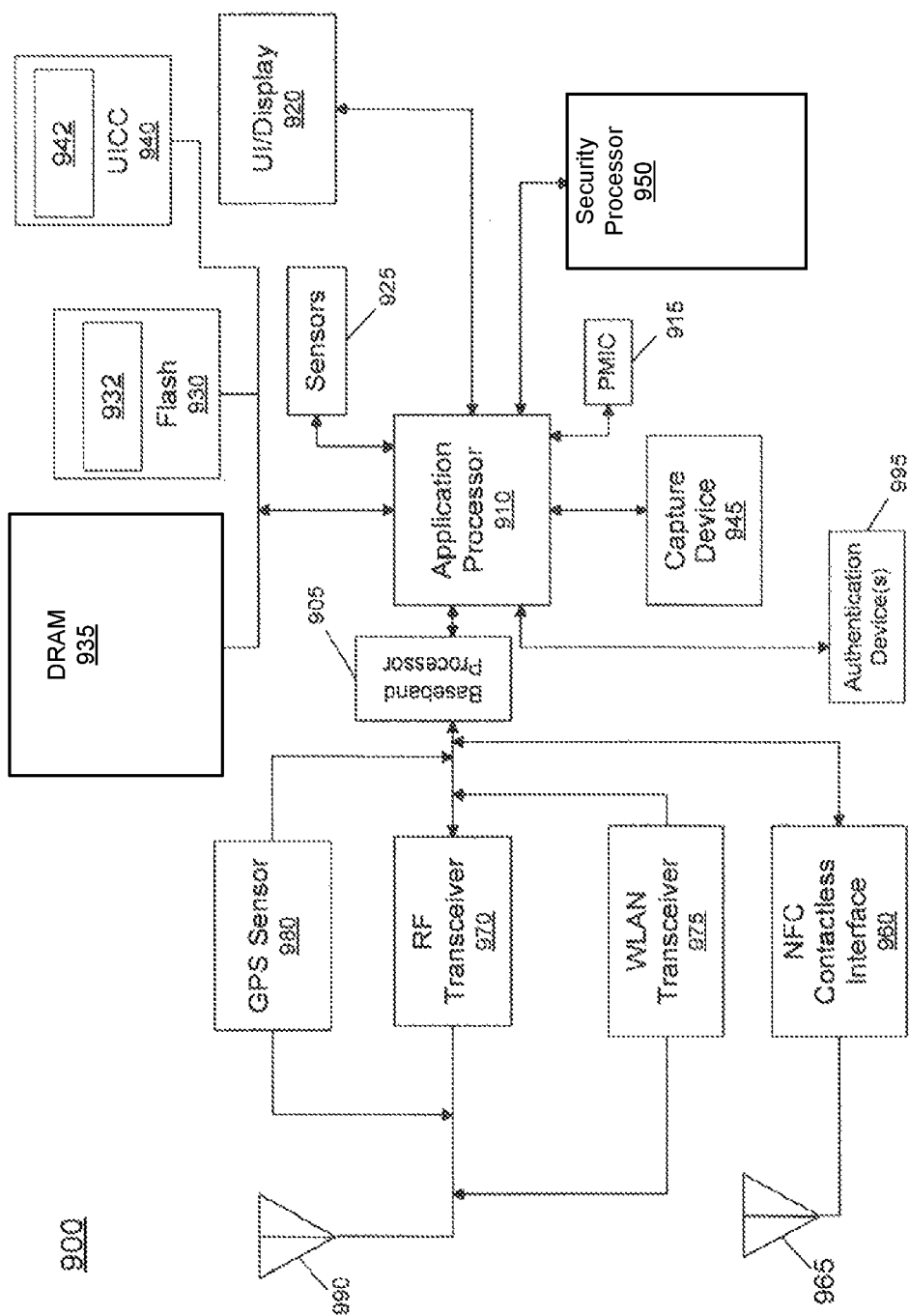
FIG. 6 is a block diagram of an example system with which embodiments can be used.

Referring now to FIG. 6, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In different embodiments, application processor 910 may include trusted IO logic, byte stream parser and cryptographic engine as described herein. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 that may implement a TEE, and which may couple to application processor 910. As an example, security processor 950 may be used in some cases to execute trusted applications and communicate securely with application processor 910, as described herein.

Furthermore, application processor 910 may implement a secure mode of operation, such as Intel® SGX for hosting of a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
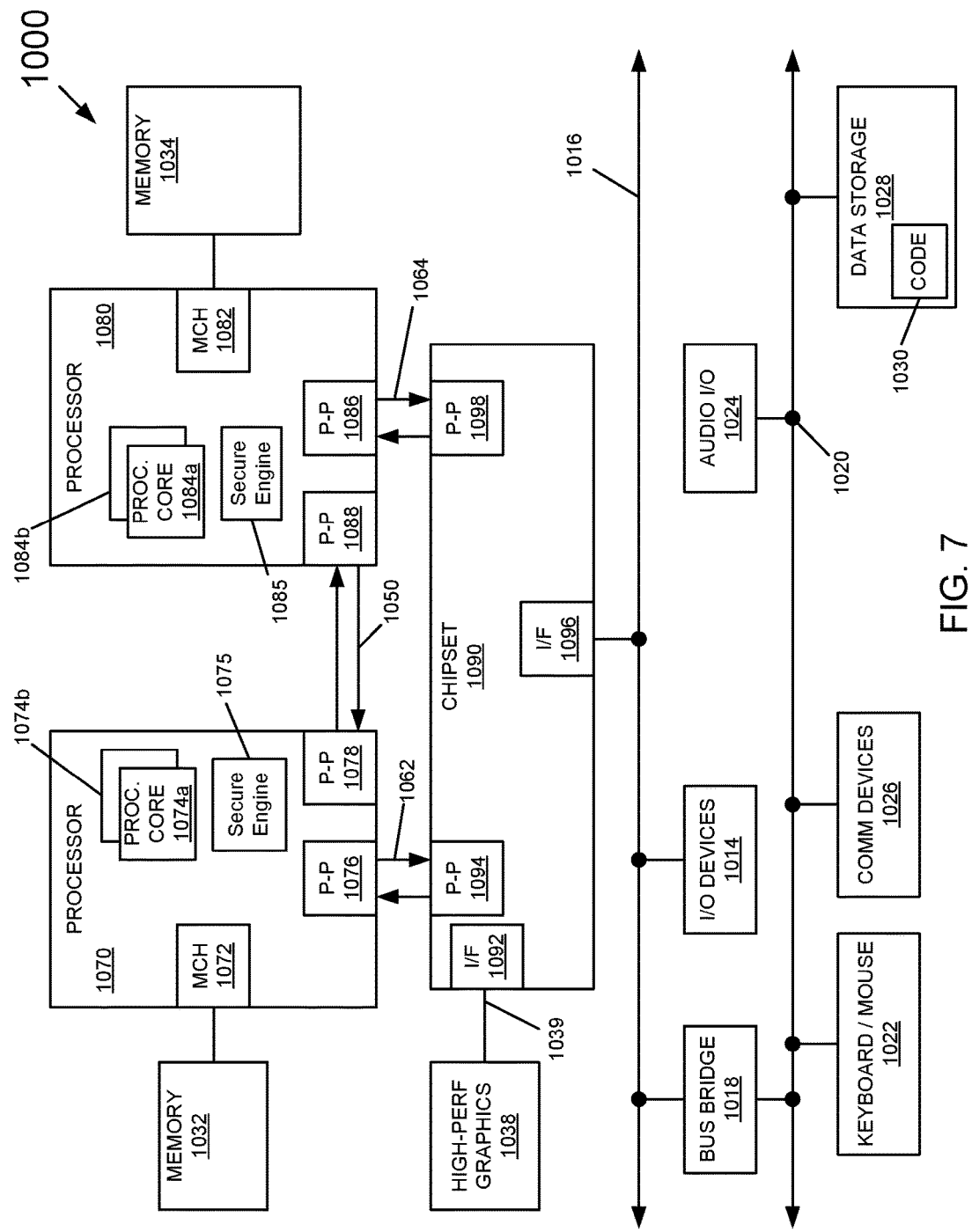
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 1000 is a point-to-point interconnect system such as a server system, and includes a first processor 1070 and a second processor 1080 coupled via a point-to-point interconnect 1050. As shown in FIG. 7, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations, including the secure end-to-end communication techniques described herein.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022 (which may be a wireless keyboard to communicate with end-to-end secure capabilities), communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 8:
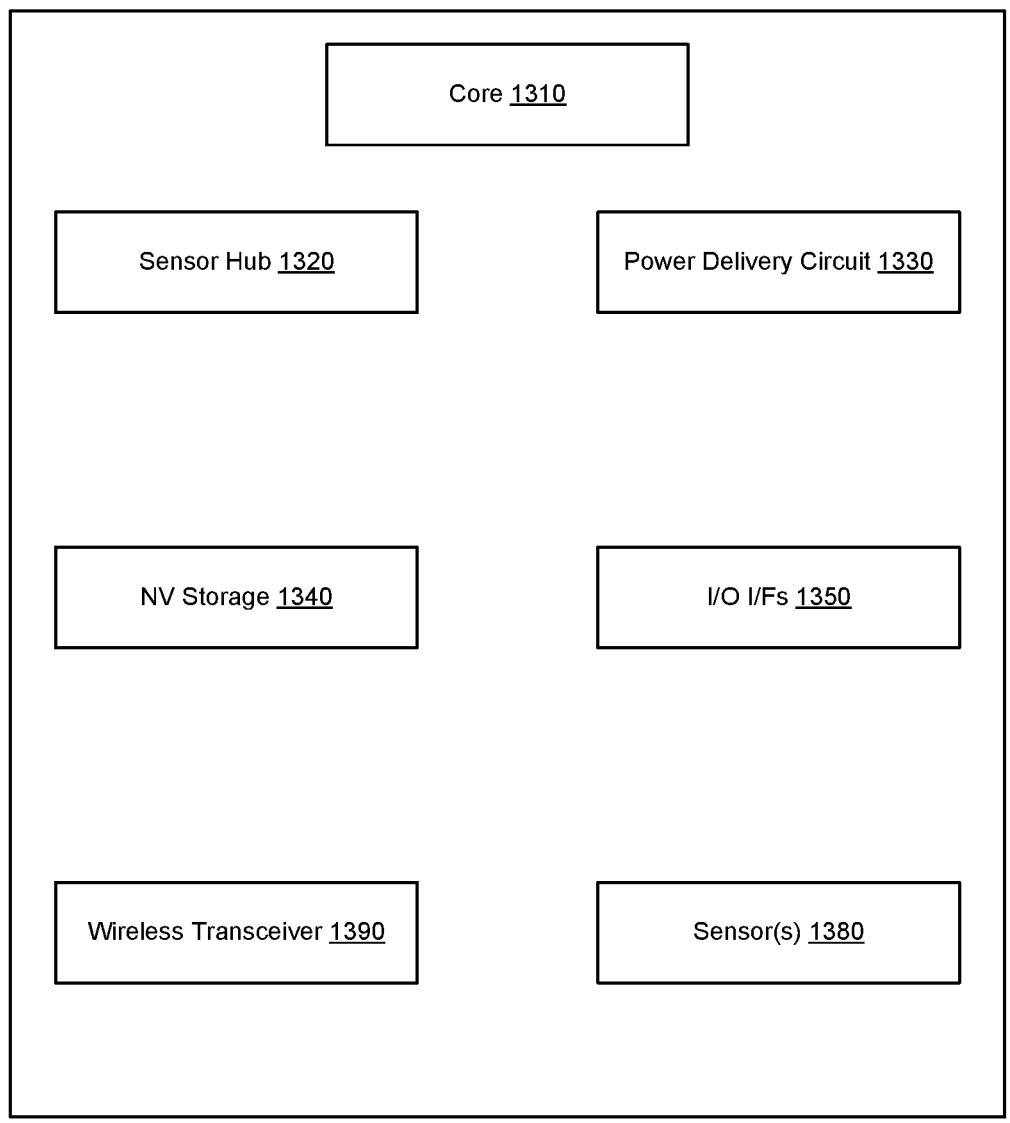
FIG. 8 is a block diagram of a wearable module in accordance with another embodiment

Embodiments may be used in environments where IoT devices may include wearable devices or other small form factor IoT devices. Referring now to FIG. 8, shown is a block diagram of a wearable module in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE and perform secure end-to-end communication as described herein. Core 1310 couples to various components including a sensor hub 1320, which may be configured to interact with a plurality of sensors 1380, such as one or more biometric, motion environmental, thermal, and/or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I$^2$C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms.

The following Examples pertain to further embodiments.

In Example 1, an apparatus comprises: a wireless controller to communicate wirelessly with one or more wireless devices. The wireless controller may include: a byte stream parser to receive a stream of data from the one or more wireless devices and parse the stream of data to identify a first data packet associated with a first channel identifier, the first channel identifier associated with a trusted application; and a cryptographic engine coupled to the byte stream parser to encrypt a payload portion of the first data packet in response to the identification of the first data packet associated with the first channel identifier. The apparatus may further include a DMA circuit coupled to the wireless controller to receive and store in a first buffer the first data packet having the encrypted payload portion, based on a request from a first trusted agent.

In Example 2, the cryptographic engine is to: first decrypt the payload portion of the first data packet via a first decryption key, the payload packet of the first data packet encrypted by the one or more wireless devices; and thereafter, in response to the identification of the first data packet, re-encrypt the payload portion of the first data packet via a first encryption key, the first encryption key associated with the first channel identifier and not associated with the first decryption key.

In Example 3, the apparatus further includes: a first TEE in which the first trusted agent is to execute; and a second TEE in which a device driver for the trusted application is to execute.

In Example 4, the apparatus comprises a system on chip, the system on chip including the wireless controller and further including one or more computing cores, where at least one of the first TEE and the second TEE is to execute on at least one of the one or more computing cores, the first TEE and the second TEE isolated from the wireless controller and an operating system.

In Example 5, the apparatus further comprises a trusted IO logic to receive a request from the trusted application for trusted input from a first wireless device of the one or more wireless devices and responsive to the request to identify the first channel identifier associated with the first wireless device.

In Example 6, the trusted IO logic is further to program the cryptographic engine with: an encryption key associated with the first channel identifier; and a trusted profile identifier associated with the first channel identifier.

In Example 7, the cryptographic engine is further to generate an authentication tag associated with the first data packet, the authentication tag comprising a hash value of the encrypted payload portion of the first data packet and an unencrypted header portion of the first data packet.

In Example 8, the DMA circuit is to store the authentication tag with the first data packet in the first buffer.

In Example 9, the wireless controller is to replace a profile identifier of the first data packet with the trusted profile identifier, to enable a host logic to forward the first data packet to the device driver.

In Example 10, a method comprises: receiving an incoming data packet in a wireless controller of a system from a wireless input device; parsing the incoming data packet in a byte stream parser to determine whether the incoming data packet is associated with a first channel identifier associated with a trusted agent; and responsive to a determination that the incoming data packet is associated with the first channel identifier, encrypting a payload portion of the incoming data packet with an encryption key associated with the first channel identifier, to enable communication of the encrypted payload portion of the incoming data packet to the trusted agent in a secure manner.

In Example 11, the method further comprises communicating the incoming data packet including the encrypted payload portion to a device driver within a TEE associated with the trusted agent.

In Example 12, the method further comprises, responsive to receipt of the encrypted payload portion in the device driver within the TEE, enabling the device driver within the TEE to decrypt the encrypted payload portion.

In Example 13, the method further comprises associating an authentication tag with the encrypted payload portion and communicating the authentication tag to the device driver with the encrypted payload portion.

In Example 14, the method further comprises replacing a profile identifier of the incoming data packet with a trusted profile identifier associated with the trusted agent.

In Example 15, the method further comprises communicating the incoming data packet including the encrypted payload portion via a shared direct memory access channel, the shared direct memory access channel shared with one or more untrusted agents.

In another Example, a computer readable medium including instructions is to perform the method of any of the above Examples.

In a further Example, a computer readable medium including data is to be used by at least one machine to fabricate at least one integrated circuit to perform the method of any one of the above Examples.

In a still further Example, an apparatus comprises means for performing the method of any one of the above Examples.

In Example 16, a system includes a SoC and at least one wireless device to couple to the SoC. The SoC may comprise at least one core, a security coprocessor, a wireless controller, a byte stream parser and a cryptographic engine. The byte stream parser may receive a stream of data from at least one wireless device and parse the stream of data to identify a first data packet associated with a first channel identifier, the first channel identifier associated with a trusted application. The cryptographic engine may encrypt a payload portion of the first data packet in response to the identification of the first data packet associated with the first channel identifier, where the wireless controller is to cause the first data packet having the encrypted payload portion to be directed to the trusted application to execute on the security coprocessor and to cause a second data packet having an unencrypted payload portion to be directed to an untrusted application to execute on the at least one core.

In Example 17, the cryptographic engine is to decrypt the first data packet and the second data packet after receipt from the at least one wireless device, and responsive to the first channel identifier, to re-encrypt the payload portion of the first data packet.

In Example 18, the at least one core is to execute a wireless software stack, the wireless software stack to receive the first data packet and direct the first data packet to the trusted application based at least in part on a trusted profile ID, where the wireless controller is to associate the trusted profile ID with the first data packet.

In Example 19, the cryptographic engine is further to generate an authentication tag associated with the first data packet, the authentication tag comprising a hash value of the encrypted payload portion of the first data packet and an unencrypted header portion of the first data packet.

In Example 20, the cryptographic engine is to receive a third data packet from the trusted application, the third data packet having an encrypted payload portion, decrypt the encrypted payload portion of the third data packet with a second decryption key, re-encrypt the third data packet with another encryption key and send the re-encrypted third data packet to the at least one wireless device.

In Example 21, an apparatus for secure communication comprises: means for receiving an incoming data packet from a wireless input device; means for parsing the incoming data packet to determine whether the incoming data packet is associated with a first channel identifier associated with a trusted agent; and means for encrypting a payload portion of the incoming data packet with an encryption key associated with the first channel identifier, to enable communication of the encrypted payload portion of the first data packet to the trusted agent in a secure manner.

In Example 22, the apparatus further comprises means for communicating the incoming data packet including the encrypted payload portion to a device driver within a TEE associated with the trusted agent.

In Example 23, the apparatus further comprises means for associating an authentication tag with the encrypted payload portion and communicating the authentication tag to the device driver with the encrypted payload portion.

In Example 24, the apparatus further comprises means for replacing a profile identifier of the incoming data packet with a trusted profile identifier associated with the trusted agent.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a wireless hardware controller to communicate wirelessly with one or more wireless devices, the wireless hardware controller comprising:
      a byte stream parser to receive a stream of data from the one or more wireless devices and parse the stream of data to identify a first data packet associated with a first channel identifier, the first channel identifier associated with a trusted application that previously registered with a trusted input/output (IO) logic; and
      a cryptographic engine coupled to the byte stream parser to encrypt a payload portion of the first data packet with a first encryption key programmed in the cryptographic engine by the trusted IO logic in response to the identification of the first data packet associated with the first channel identifier, wherein the cryptographic engine is to:
         first decrypt the payload portion of the first data packet via a first decryption key, the payload portion of the first data packet encrypted by the one or more wireless devices; and
         thereafter, in response to the identification of the first data packet, re-encrypt the payload portion of the first data packet via the first encryption key, the first encryption key associated with the first channel identifier and not associated with the first decryption key; and
   a direct memory access (DMA) hardware circuit coupled to the wireless hardware controller to receive and store in a first buffer the first data packet having the encrypted payload portion, based on a request from a first trusted agent.

2. The apparatus of claim 1, further comprising:
   a first trusted execution environment (TEE) in which the first trusted agent is to execute; and
   a second TEE in which a device driver for the trusted application is to execute.

3. The apparatus of claim 2, wherein the apparatus comprises a system on chip, the system on chip including the wireless hardware controller and further including one or more computing cores, wherein at least one of the first TEE and the second TEE is to execute on at least one of the one or more computing cores, the first TEE and the second TEE isolated from the wireless hardware controller and an operating system.

4. The apparatus of claim 2, wherein the trusted IO logic is to receive a request from the trusted application for trusted input from a first wireless device of the one or more wireless devices and responsive to the request to identify the first channel identifier associated with the first wireless device.

5. The apparatus of claim 4, wherein the trusted IO logic is further to program the cryptographic engine with:
   a trusted profile identifier associated with the first channel identifier.

6. The apparatus of claim 5, wherein the cryptographic engine is further to generate an authentication tag associated with the first data packet, the authentication tag comprising a hash value of the encrypted payload portion of the first data packet and an unencrypted header portion of the first data packet.

7. The apparatus of claim 6, wherein the DMA hardware circuit is to store the authentication tag with the first data packet in the first buffer.

8. The apparatus of claim 5, wherein the wireless hardware controller is to replace a profile identifier of the first data packet with the trusted profile identifier, to enable a host logic to forward the first data packet to the device driver.

9. At least one non-transitory computer readable storage medium comprising instructions that when executed enable a system to:
   receive an incoming data packet in a wireless controller of the system from a wireless input device;
   decrypt a payload portion of the incoming data packet with a first decryption key;
   parse the incoming data packet in a byte stream parser to determine whether the incoming data packet is associated with a first channel identifier associated with a trusted agent that previously registered with a trusted input/output (IO) logic; and
   responsive to a determination that the incoming data packet is associated with the first channel identifier, re-encrypt the payload portion of the incoming data packet with a first encryption key associated with the first channel identifier and programmed by the trusted IO logic, the first encryption key not associated with the first decryption key, to enable communication of the encrypted payload portion of the incoming data packet to the trusted agent in a secure manner.

10. The non-transitory computer readable storage medium of claim 9, further comprising instructions that when executed enable the system to communicate the incoming data packet including the encrypted payload portion to a device driver within a trusted execution environment (TEE) associated with the trusted agent.

11. The non-transitory computer readable storage medium of claim 10, further comprising instructions that when executed enable the system, responsive to receipt of the encrypted payload portion in the device driver within the TEE, to enable the device driver within the TEE to decrypt the encrypted payload portion.

12. The non-transitory computer readable storage medium of claim 11, further comprising instructions that when executed enable the system to associate an authentication tag with the encrypted payload portion and communicate the authentication tag to the device driver with the encrypted payload portion.

13. The non-transitory computer readable storage medium of claim 9, further comprising instructions that when executed enable the system to replace a profile identifier of the incoming data packet with a trusted profile identifier associated with the trusted agent.

14. The non-transitory computer readable storage medium of claim 9, further comprising instructions that when executed enable the system to communicate the incoming data packet including the encrypted payload portion via a shared direct memory access channel, the shared direct memory access channel shared with one or more untrusted agents.

15. A system comprising:
a system on chip (SoC) comprising at least one core, a security hardware coprocessor, a wireless hardware controller, a byte stream parser and a cryptographic engine, wherein:
the byte stream parser is to receive a stream of data from at least one wireless device and parse the stream of data to identify a first data packet associated with a first channel identifier, the first channel identifier associated with a trusted application that previously registered with a trusted input/output (IO) logic; and
the cryptographic engine is to encrypt a payload portion of the first data packet with a first encryption key programmed in the cryptographic engine by the trusted IO logic in response to the identification of the first data packet associated with the first channel identifier, wherein the wireless hardware controller is to cause the first data packet having the encrypted payload portion to be directed to the trusted application to execute on the security hardware coprocessor and to cause a second data packet having an unencrypted payload portion to be directed to an untrusted application to execute on the at least one core, wherein the cryptographic engine is to decrypt the first data packet and the second data packet after receipt from the at least one wireless device with a first decryption key, and responsive to the first channel identifier, to re-encrypt the payload portion of the first data packet with the first encryption key, the first encryption key not associated with the first decryption key; and
the at least one wireless device to couple to the SoC.

16. The system of claim 15, wherein the at least one core is to execute a wireless software stack, the wireless software stack to receive the first data packet and direct the first data packet to the trusted application based at least in part on a trusted profile ID, wherein the wireless hardware controller is to associate the trusted profile ID with the first data packet.

17. The system of claim 15, wherein the cryptographic engine is further to generate an authentication tag associated with the first data packet, the authentication tag comprising a hash value of the encrypted payload portion of the first data packet and an unencrypted header portion of the first data packet.

18. The system of claim 15, wherein the cryptographic engine is to receive a third data packet from the trusted application, the third data packet having an encrypted payload portion, decrypt the encrypted payload portion of the third data packet with a second decryption key, re-encrypt the third data packet with another encryption key and send the re-encrypted third data packet to the at least one wireless device.

* * * * *